US012719250B1

(12) United States Patent
Baldwin

(10) Patent No.: US 12,719,250 B1
(45) Date of Patent: Aug. 25, 2026

(54) HORIZONTAL AND VERTICAL WEATHERPROOF COVER PLATE WITH NON-COMPATIBLE HINGE PINS

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 180 days.

(21) Appl. No.: 18/401,178

(22) Filed: Dec. 29, 2023

Related U.S. Application Data

(60) Provisional application No. 63/445,152, filed on Feb. 13, 2023.

(51) Int. Cl.

| | |
|---|---|
| ***H02G 3/14*** | (2006.01) |
| ***H01R 13/447*** | (2006.01) |
| ***H01R 13/52*** | (2006.01) |
| ***H02G 3/08*** | (2006.01) |

(52) U.S. Cl.
CPC ............ *H02G 3/14* (2013.01); *H01R 13/447* (2013.01); *H01R 13/5213* (2013.01); *H02G 3/088* (2013.01)

(58) Field of Classification Search
CPC ........... H02G 3/08; H02G 3/081; H02G 3/14; H02G 3/088; H01R 13/447; H01R 13/5213; H01R 13/52
USPC .......... 174/480, 481, 50, 53, 57, 58, 66, 67; 220/3.2–3.9, 4.02, 241, 242; 439/135, 439/136
See application file for complete search history.

(56) References Cited

U.S. PATENT DOCUMENTS 3,654,663 A * 4/1972 Algotsson ............... H01H 9/04 220/3.8
5,076,641 A * 12/1991 Lindberg ................. B60R 7/04 49/193
7,439,444 B1 10/2008 Maltby
7,459,632 B2 * 12/2008 Bowman ............... E04F 19/083 174/67
7,462,778 B1 12/2008 Shotey
7,598,453 B1 10/2009 Shotey
7,619,162 B2 * 11/2009 Dinh .................... H01R 13/447 174/53
7,968,794 B1 * 6/2011 Baldwin ................. H02G 3/18 174/67
8,153,895 B2 * 4/2012 Drane .................... H02G 3/088 174/66
8,251,253 B1 8/2012 Cleghorn
(Continued)

*Primary Examiner* — Angel R Estrada
(74) *Attorney, Agent, or Firm* — Kenneth C. Booth; Booth Udall, PLC

(57) ABSTRACT

An electrical outlet cover assembly with a base, a cover, and at least two hinge sets. The base is configured to surround an electrical device. The cover is configured to couple with the base to enclose and protect the electrical device. The hinge sets are each configured to separately couple the cover to the base. Each of the hinge sets includes a pin configured to couple with the base and the cover in an inserted position to couple the cover to the base. The pin head of each of the pins is sized and shaped to insert into a corresponding pin head cavity. Each of the pin heads may be a different size or shape from each other pin head. The pin of a first hinge set may have a diameter that is different from a diameter of the pin of a second hinge set.

20 Claims, 13 Drawing Sheets

(56) References Cited

U.S. PATENT DOCUMENTS

| | | | | |
|---|---|---|---|---|
| 9,219,357 | B1 * | 12/2015 | Elbaz | H02G 3/088 |
| 9,680,292 | B2 * | 6/2017 | Wijaya | H02G 3/14 |
| 10,199,814 | B2 * | 2/2019 | Mortun | H02G 3/081 |
| 11,784,477 | B2 * | 10/2023 | Ustianowski | H01R 13/5213 174/530 |

* cited by examiner 100
102
104
108
108
110
111
113
118
120
122
126
130
132
134
136
140
144
148
148
150
150
150
152
152
154
154
156
156
158
158
160
160
162
162
164
164

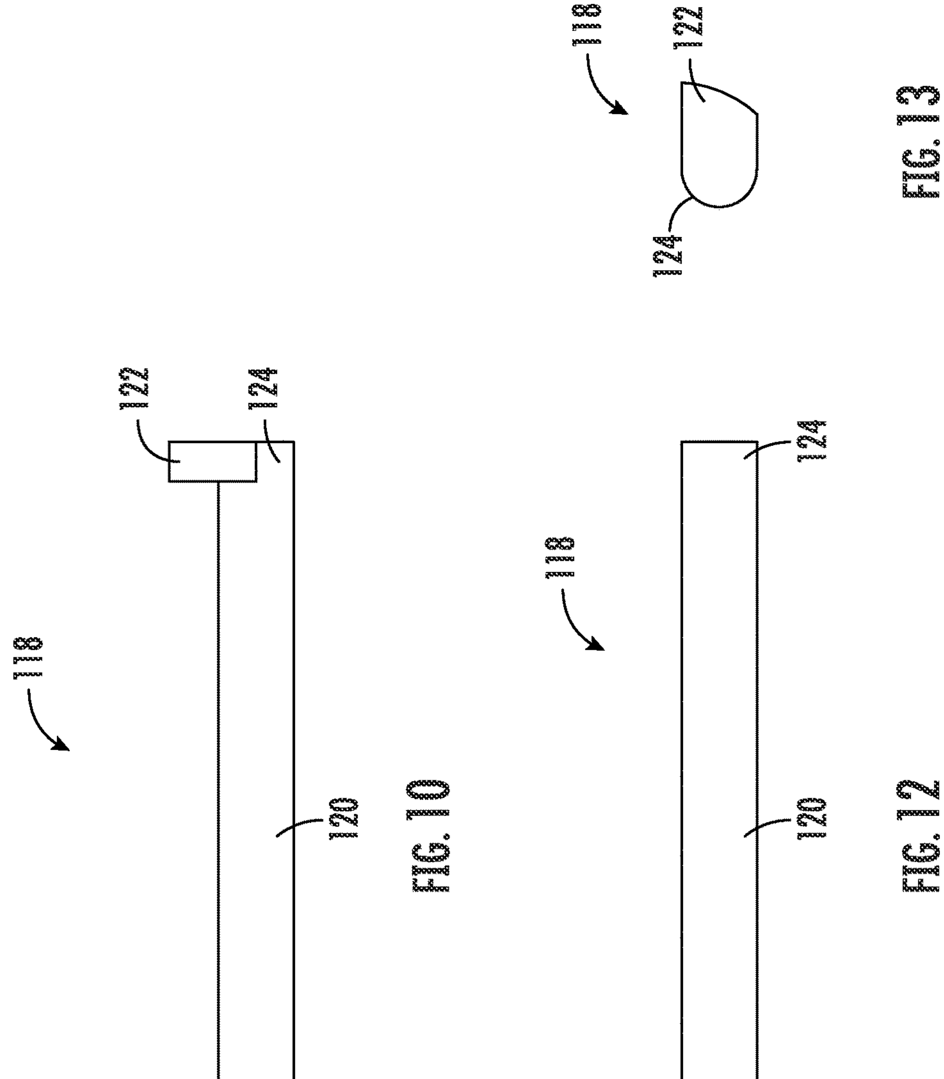
118
122
124
FIG. 13
122
124
118
124
118
120
FIG. 10
120
FIG. 12
126
126
126
128
128
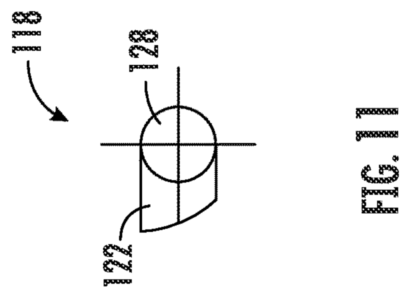
118
128
122
FIG. 11

HORIZONTAL AND VERTICAL WEATHERPROOF COVER PLATE WITH NON-COMPATIBLE HINGE PINS

RELATED APPLICATIONS

This application claims the benefit of U.S. provisional patent application 63/445,152, filed Feb. 13, 2023, to Jeffrey P. Baldwin, titled "Horizontal and Vertical Weatherproof Cover with Non-Compatible Hinge Pins," the entirety of the disclosure of which is hereby incorporated by this reference.

TECHNICAL FIELD

This document relates to weatherproof outlet and switch covers. More specifically, this document relates to a weatherproof cover that uses one or more additional hinge pin clip(s) and differing hinge pins to enable the cover to be mounted either horizontally or vertically using a selection of the appropriate hinge pin and adapter clip.

BACKGROUND

Weatherproof covers capable of installation either horizontally or vertically generally involves a first set of hinge pieces on a first, respectively shorter, side of the respective base and lid of the cover plate, and a second set of hinge pieces on a second, respectively longer, side of the respective base and lid of the cover, with the second side being adjacent to the first side. During installation of the cover, the respective hinge piece sets are assembled to allow the cover to be assembled so that it hinges along either the shorter side or the longer side. Depending upon the hinge type used for the cover assembly, for example, if a removable hinge pin is used, there can be frustration expressed by the installers that the wrong size hinge pin is used and that the cover takes longer to install because of identifying or switching to the right hinge pin.

SUMMARY

Aspects of this document relate to an electrical outlet cover assembly, comprising a base configured to surround an electrical device, a cover configured to hingedly couple with the base to enclose and protect the electrical device, at least two hinge sets each configured to separately couple the cover to the base, wherein each of the at least two hinge sets includes a pin comprising a shaft, a pin head positioned on a first end of the shaft, and a channel formed into the shaft adjacent to a second end of the shaft opposite the first end, wherein the pin is configured to rotatably couple with the base and fixedly couple with the cover in an inserted position to hingedly couple the cover to the base, and at least one retainer having a clip configured to extend around the shaft of one of the pins of the at least two hinge sets within the channel and lock the pin in the inserted position, wherein the at least two hinge sets comprises a vertical hinge set configured to hingedly pivot the cover in relation to the base about a first hinge axis and a horizontal hinge set configured to hingedly pivot the cover in relation to the base about a second hinge axis perpendicular to the first hinge axis, wherein the pin of the vertical hinge set has a diameter that is different from a diameter of the pin of the horizontal hinge set, and wherein the pin head of each of the pins of the at least two hinge sets is sized and shaped to insert into a corresponding pin head cavity on the cover when the pin is in the inserted position, wherein each of the pin heads comprises a different size or shape from each other pin head of the at least two hinge sets.

Particular embodiments may comprise one or more of the following features. Each of the at least two hinge sets may comprise a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm. The first cover hole may be a through hole and the second cover hole may be a blind hole. When in the inserted position, the pin may extend through the first cover hole, may extend through the base hole, and may extend into the second cover hole. The first cover hole and the second cover hole of the cover arm may be spaced apart to fit the base arm and the retainer between the first cover hole and the second cover hole.

Aspects of this document relate to an electrical outlet cover assembly, comprising a base configured to surround an electrical device, a cover configured to couple with the base to enclose and protect the electrical device, and at least two hinge sets each configured to separately couple the cover to the base, wherein each of the at least two hinge sets includes a pin comprising a shaft and a pin head positioned on a first end of the shaft, wherein the pin is configured to couple with the base and the cover in an inserted position to couple the cover to the base, wherein the pin head of each of the pins of the at least two hinge sets is sized and shaped to insert into a corresponding pin head cavity on the base or the cover when the pin is in the inserted position, wherein each of the pin heads comprises a different size or shape from each other pin head of the at least two hinge sets.

Particular embodiments may comprise one or more of the following features. The cover assembly may further comprise a retainer having a clip configured to extend around the shaft of one of the pins of the at least two hinge sets and lock the pin in the inserted position. The pin of each of the at least two hinge sets may further comprise a channel formed into the shaft adjacent to a second end of the shaft opposite the first end, wherein the clip of the retainer is configured to extend around the shaft of the pin within the channel. The at least two hinge sets may comprise a first hinge set and a second hinge set and the pin of the first hinge set may have a diameter that is different from a diameter of the pin of the second hinge set. Each of the at least two hinge sets may comprise a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm. The first cover hole may be a through hole and the second cover hole may be a blind hole. When in the inserted position, the pin may extend through the first cover hole, through the base hole, and into the second cover hole. The first cover hole and the second cover hole of the cover arm may be spaced apart to fit the base arm and a retainer between the first cover hole and the second cover hole and the retainer may have a clip configured to extend around the shaft of one of the pins of the at least two hinge sets and lock the pin in the inserted position.

Aspects of this document relate to an electrical outlet cover assembly, comprising a base configured to surround an electrical device, a cover configured to couple with the base to enclose and protect the electrical device, and at least two hinge sets configured to separately couple the cover to the base, wherein each of the at least two hinge sets has a pin configured to couple with the base and the cover in an inserted position to couple the cover to the base, wherein the at least two hinge sets comprises a first hinge set and a second hinge set and wherein the pin of the first hinge set has a diameter that is different from a diameter of the pin of the second hinge set.

Particular embodiments may comprise one or more of the following features. The cover assembly may further comprise a retainer having a clip configured to extend around the shaft of one of the pins of the at least two hinge sets and lock the pin in the inserted position. The pin of each of the at least two hinge sets may further comprise a channel formed into the shaft adjacent to a second end of the shaft opposite the first end, wherein the clip of the retainer is configured to extend around the shaft of the pin within the channel. Each of the at least two hinge sets may comprise a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm. The first cover hole may be a through hole and the second cover hole may be a blind hole. When in the inserted position, the pin may extend through the first cover hole, through the base hole, and into the second cover hole. The first cover hole and the second cover hole of the cover arm may be spaced apart to fit the base arm and a retainer between the first cover hole and the second cover hole and the retainer may have a clip configured to extend around the shaft of one of the pins of the at least two hinge sets and lock the pin in the inserted position.

The foregoing and other aspects, features, and advantages will be apparent from the DESCRIPTION and DRAWINGS, and from the CLAIMS if any are included.

BRIEF DESCRIPTION OF THE DRAWINGS

Implementations will hereinafter be described in conjunction with the appended and/or included DRAWINGS, where like designations denote like elements, and:

FIG. 10 is top view of a horizontal hinge pin according to some embodiments;

FIG. 11 is a left-side view of a horizontal hinge pin according to some embodiments;

FIG. 12 is a front view of a horizontal hinge pin according to some embodiments;

FIG. 13 is a right-side view of a horizontal hinge pin according to some embodiments;

DETAILED DESCRIPTION

Figure 1:
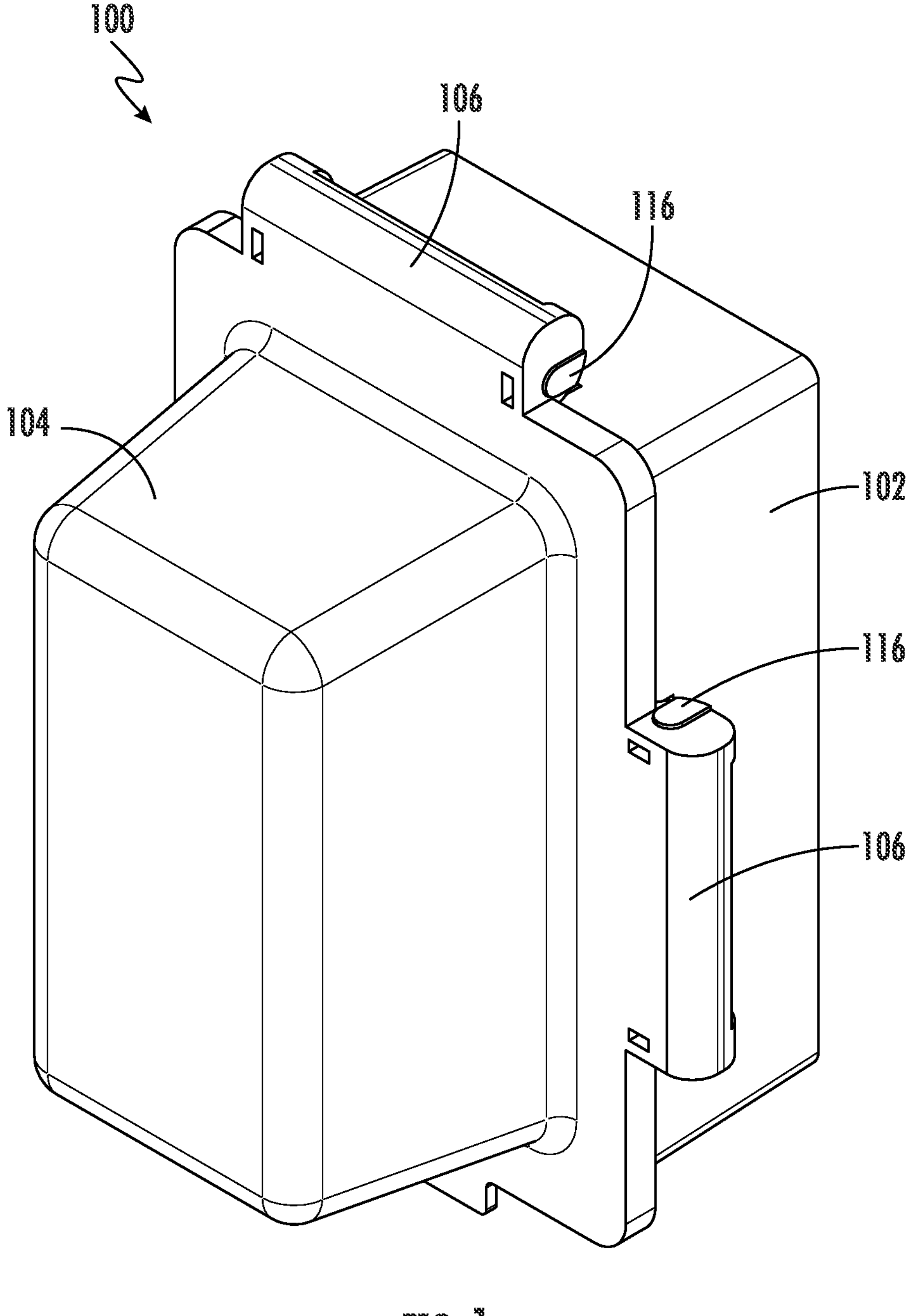
FIG. 1 is a front perspective view of an electrical outlet cover assembly according to some embodiments.
Figure 2:
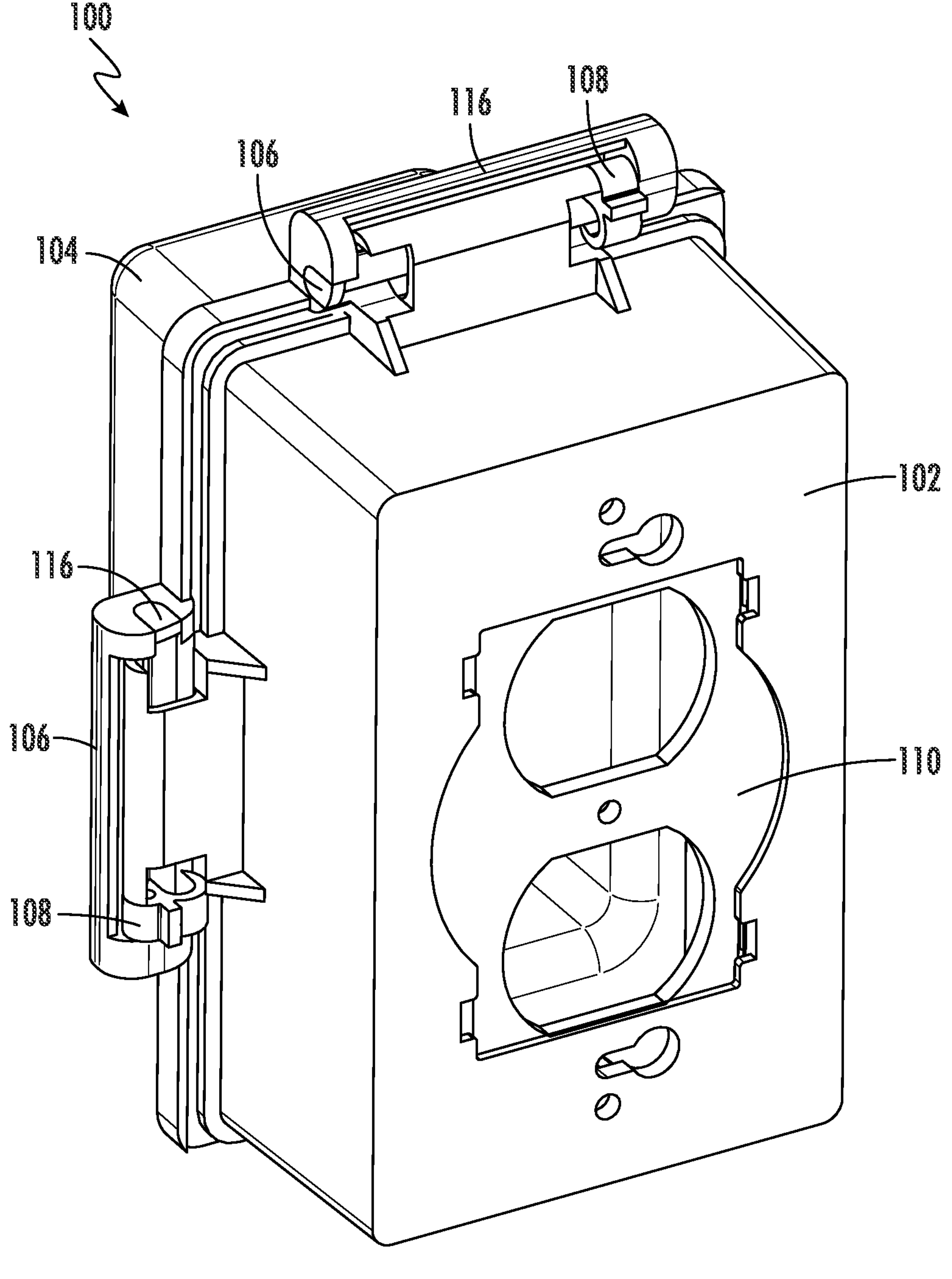
FIG. 2 is a rear perspective view of an electrical outlet cover assembly according to some embodiments.
Figure 3:
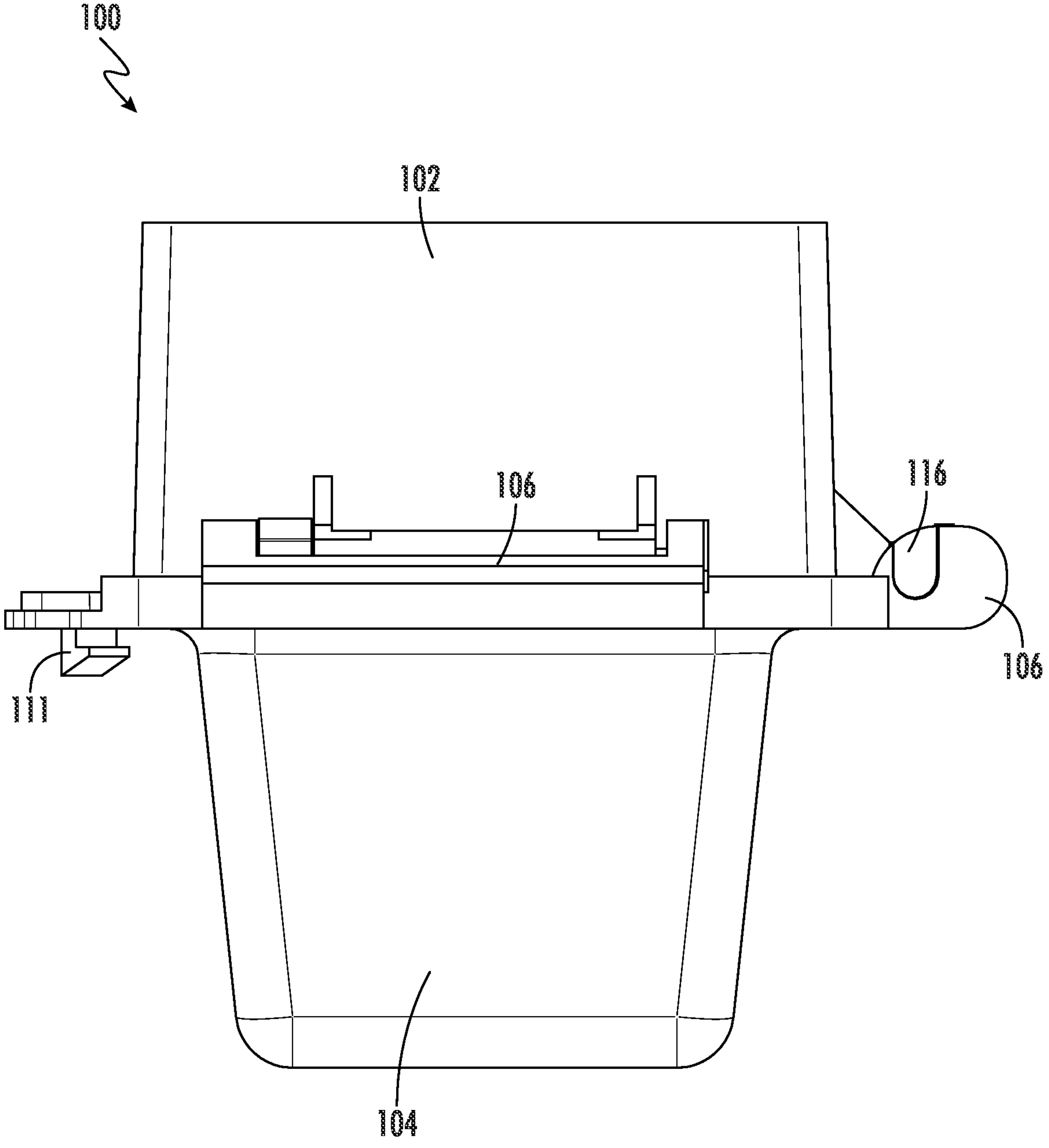
FIG. 3 is a top view of an electrical outlet cover assembly according to some embodiments.
Figure 4:
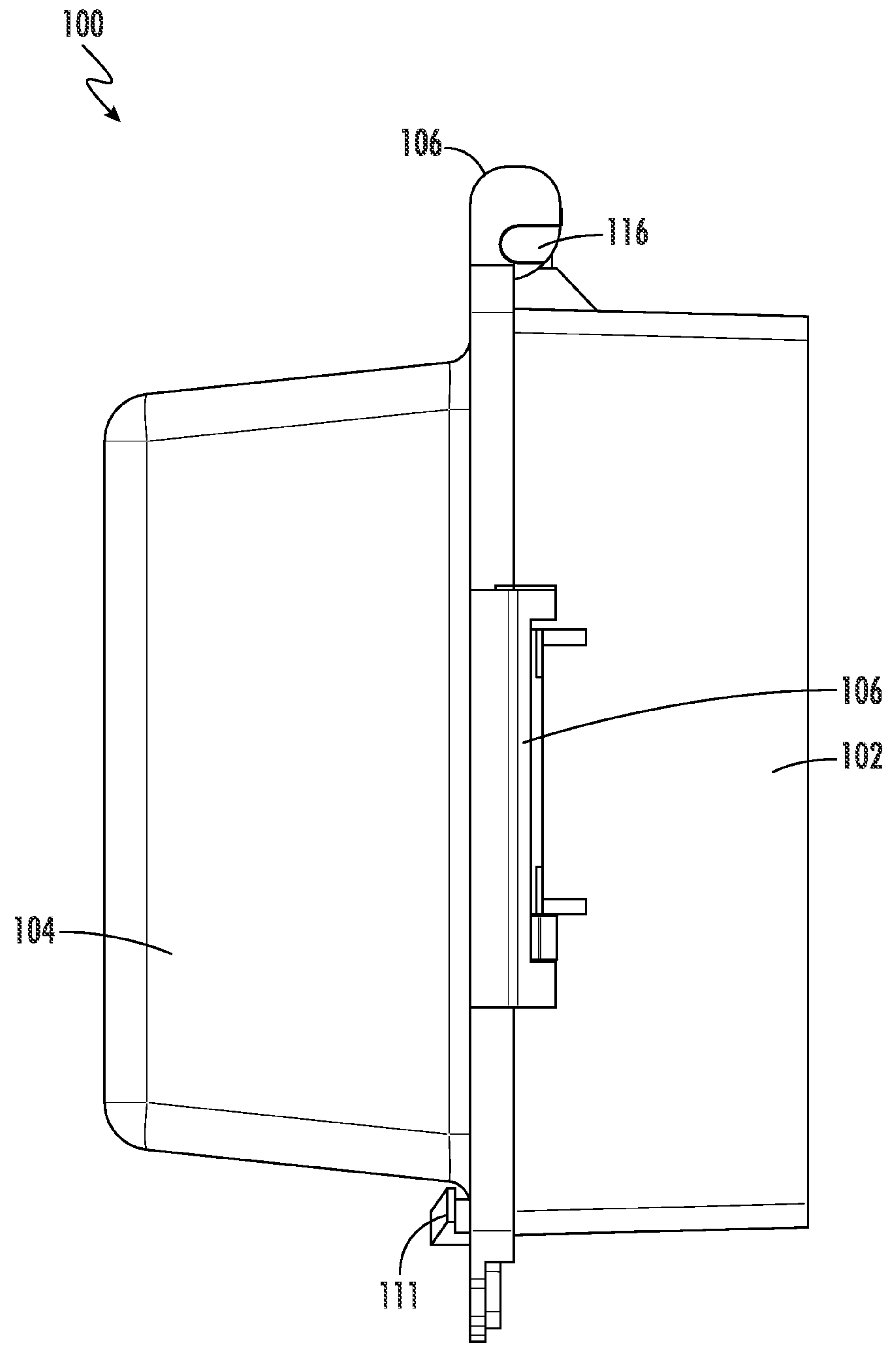
FIG. 4 is a right-side view of an electrical outlet cover assembly according to some embodiments.
Figure 5:
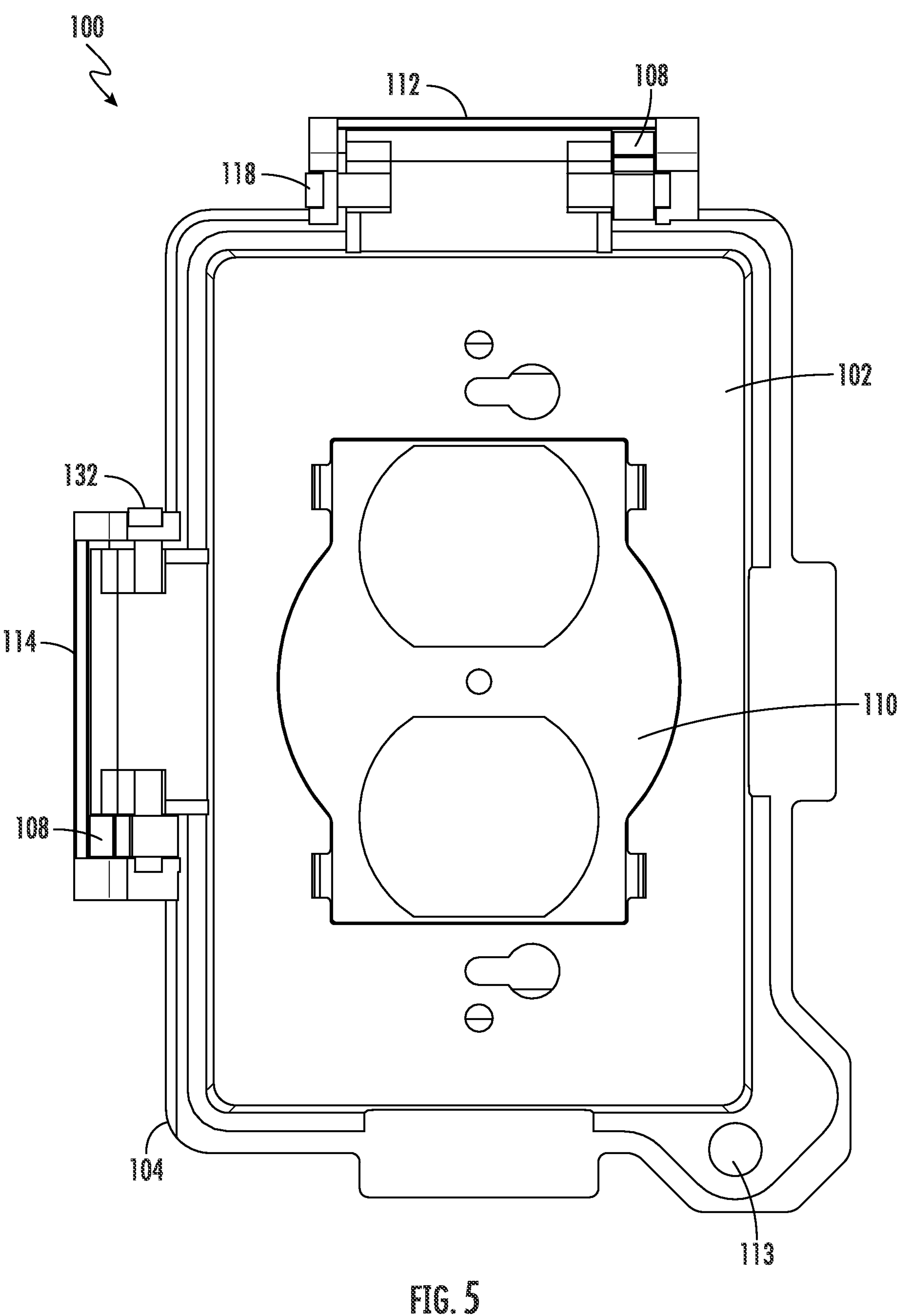
FIG. 5 is a rear view of an electrical outlet cover assembly according to some embodiments.
Figure 6:
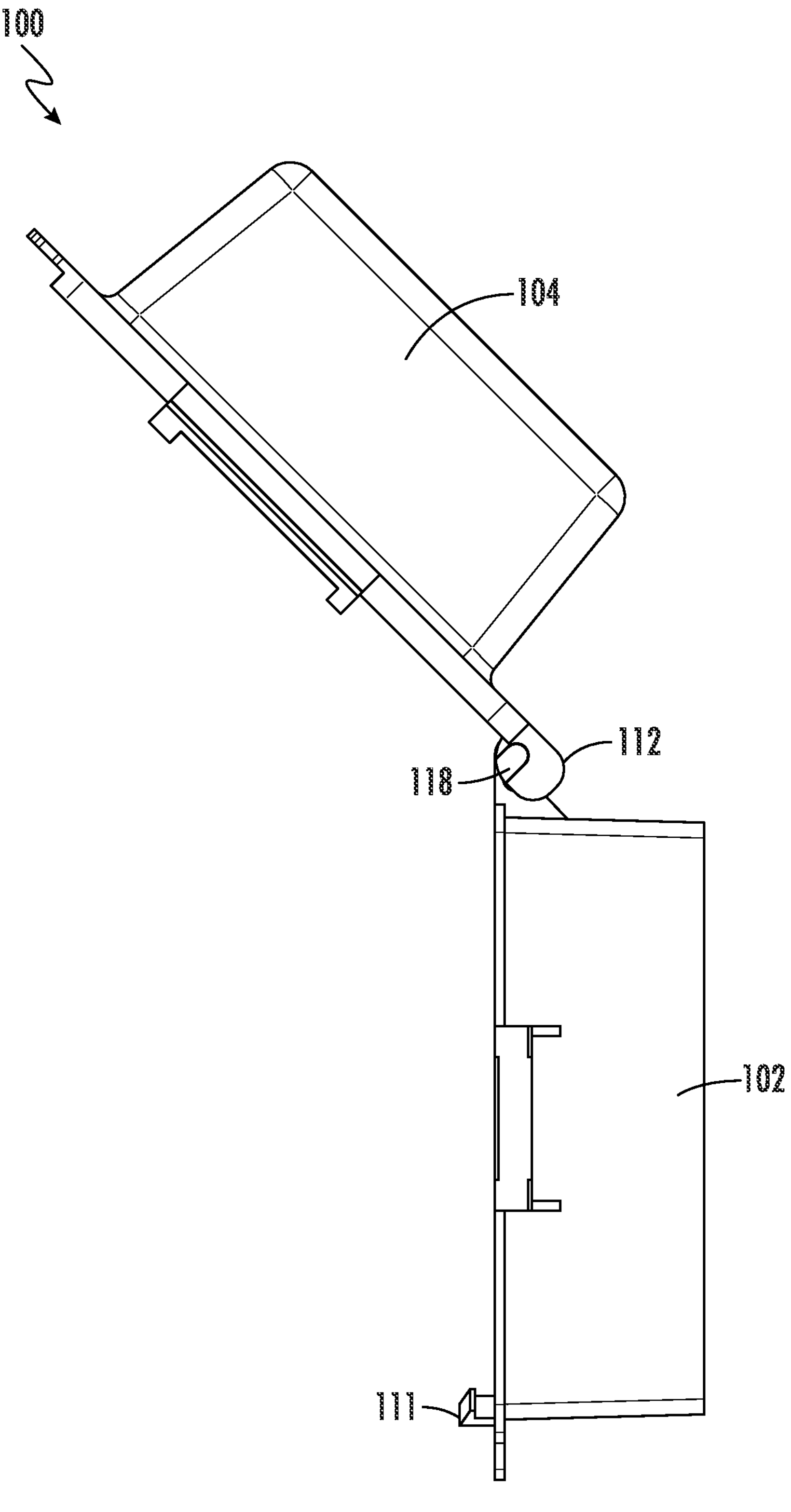
FIG. 6 is a right-side view of an electrical outlet cover assembly according to some embodiments with the horizontal pin engaged and the cover assembly in an open position.
Figure 7:
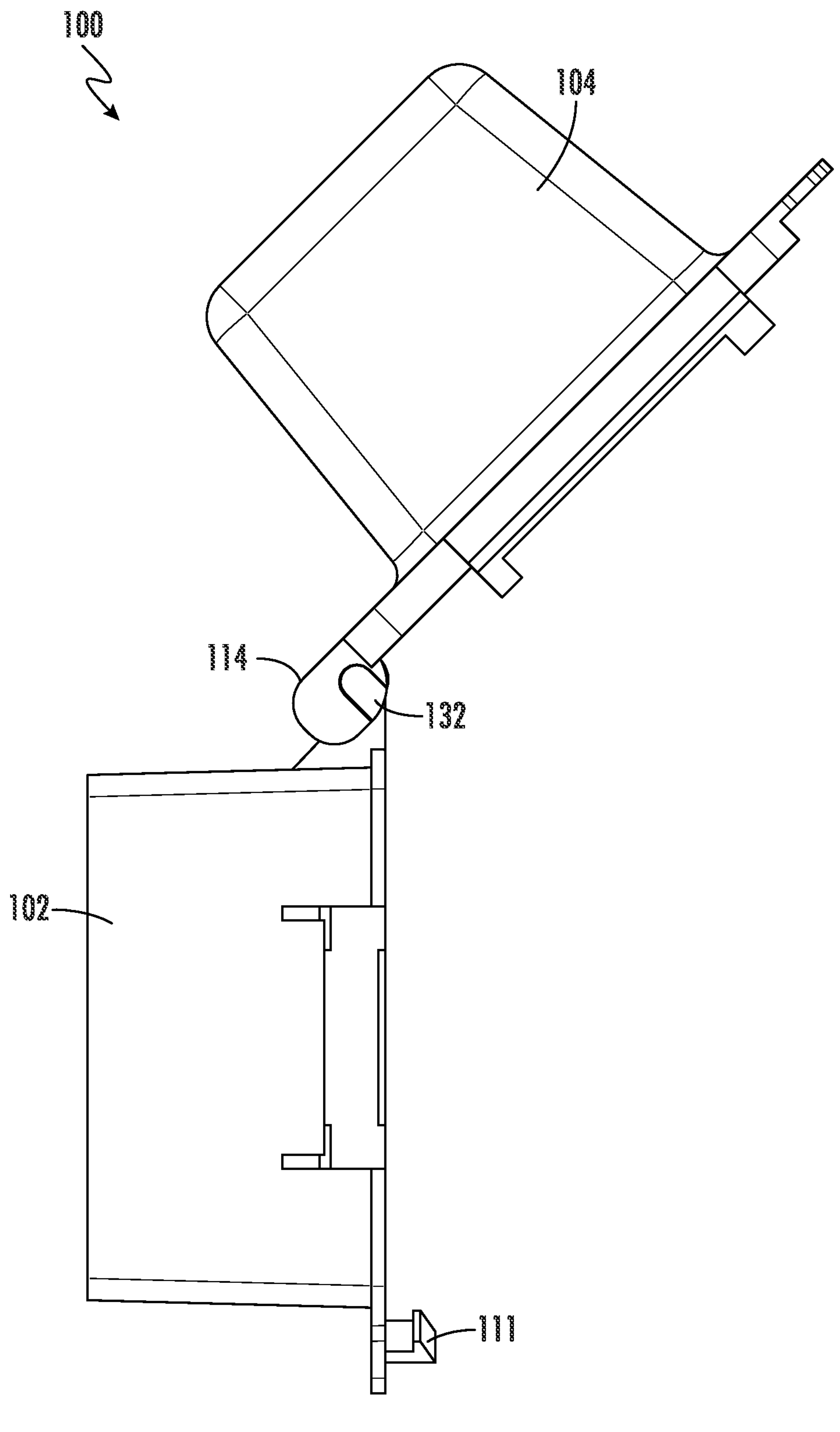
FIG. 7 is a top view of an electrical outlet cover assembly according to some embodiments with the vertical pin engaged and the cover assembly in an open position.
Figure 8:
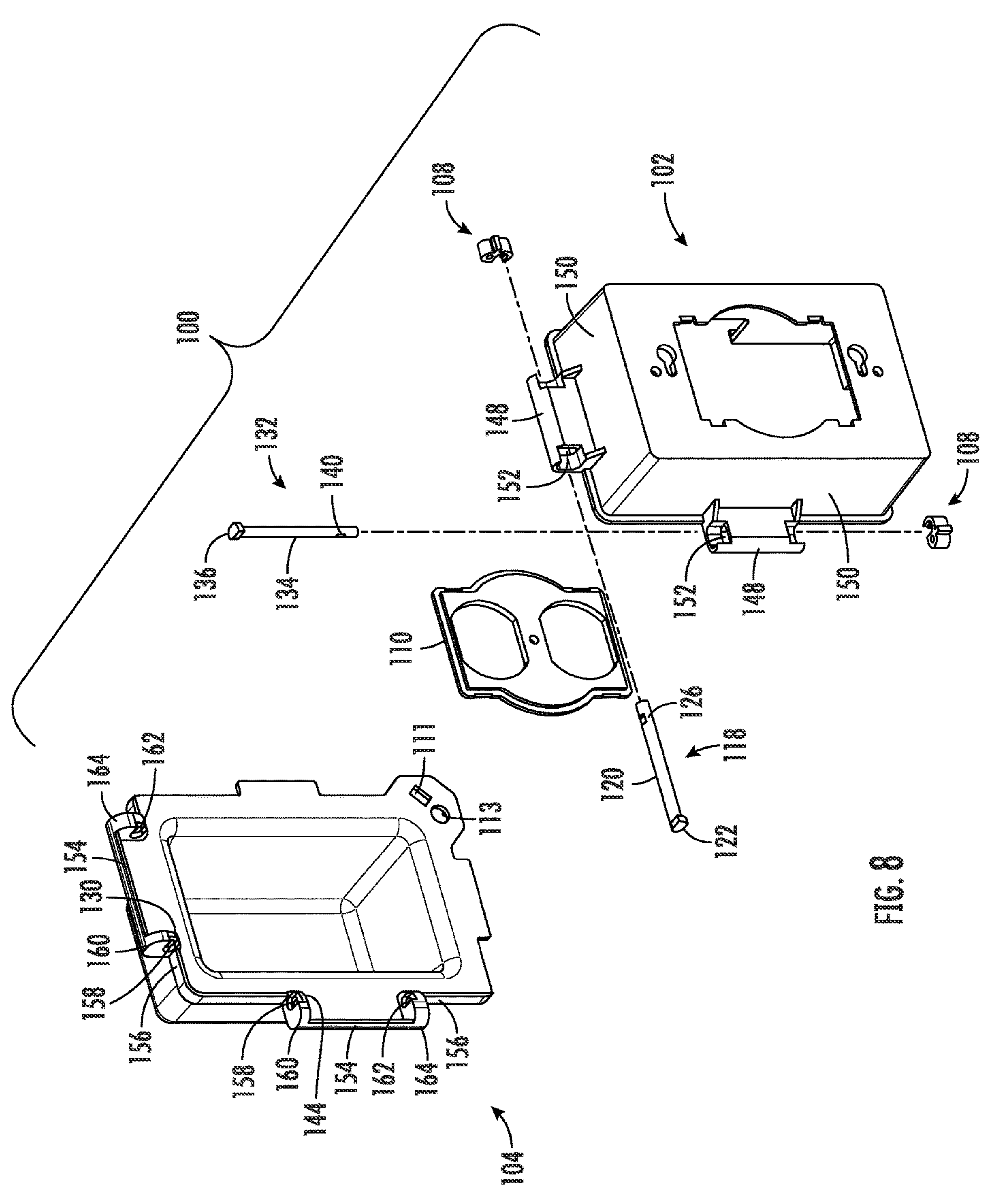
FIG. 8 is a rear exploded view of an electrical outlet cover assembly according to some embodiments.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to an electrical outlet cover assembly 100. In some embodiments, the cover assembly 100 has a base 102, a cover 104, and at least two separate hinge sets 106. The hinge sets 106 allow the base 102 to be coupled to the cover 104 in two separate and distinct ways. This allows the cover assembly 100 to be adapted to fit the preferences of the user and the requirements of specific installation sites. For example, the cover assembly 100 can be adapted to be installed on both vertically and horizontally oriented electrical outlets and/or switches. The hinge sets 106 are designed to incorporate differences between similar components of each hinge set 106 to reduce confusion and time needed to change one component out for another.

As shown in FIGS. 1-8, the cover assembly 100 may comprise the base 102, the cover 104, the hinge sets 106, and/or at least one retainer 108. The base 102 is configured to surround an electrical device and the cover 104 is configured to hingedly couple with the base 102 to enclose and protect the electrical device. The cover assembly 100 may also comprise an adapter 110 to adapt the base 102 to fit different types of electrical outlets or switches. In some embodiments, the cover 104 and the base 102 also together form a latch 111 to maintain the cover 104 in a closed position with respect to the base 102. The cover 104 and the base 102 may also form a locking aperture 113 (see FIG. 5) for receiving a lock configured to lock the cover 104 to the base 102.

In some embodiments, the hinge sets 106 comprise a first hinge set 112 and a second hinge set 114. The first hinge set 112 may be a horizontal hinge set and the second hinge set 114 may be a vertical hinge set. The first hinge set 112 is configured to hingedly pivot the cover 104 in relation to the base 102 about a first hinge axis and the second hinge set 114 is configured to hingedly pivot the cover 104 in relation to the base 102 about a second hinge axis. In some embodiments, the second hinge axis is perpendicular to the first hinge axis.

Each of the hinge sets 106 may be configured to separately couple the cover 104 to the base 102, as mentioned above. Thus, the user can select which hinge set 106 to use based on user preference as well as requirements of the specific installation site and then use that hinge set 106 to couple the cover 104 to the base 102. In some embodiments, each of the hinge sets 106 includes a pin 116. In some embodiments, the pin 116 is configured to rotatably couple with the base 102 and fixedly couple with the cover 104 when in an inserted position, as described in more detail below. This hingedly couples the cover 104 to the base 102. In some embodiments, the pin 116 is configured to rotatably couple with the cover 104 and fixedly couple with the base 102 when in the inserted position. Thus, generally, the pin 116 is configured to couple with both the base 102 and the cover 104 when in the inserted position to couple the cover 104 to the base 102.

While the features of the pins 116 are generally the same, in some embodiments, there are variations between the pin 116 of the first hinge set 112 and the pin 116 of the second hinge set 114. In some embodiments, as shown in FIGS. 9-13, the pin 116 of the first hinge set 112 is a pin 118. In some embodiments, the pin 118 comprises a shaft 120, a pin head 122 positioned on a first end 124 of the shaft 120, and/or a channel 126 formed into the shaft 120 adjacent to a second end 128 of the shaft 120 opposite the first end 124. In some embodiments, the channel 126 is formed into both sides of the shaft 120. In some embodiments, the pin head 122 is sized and shaped to insert into a corresponding pin head cavity 130 on the cover 104 when the pin 118 is in the inserted position.

In some embodiments, as shown in FIGS. 14-18, the pin 116 of the second hinge set 114 is a pin 132. Pin 132 may have any features described with reference to pin 118. In some embodiments, the pin 132 comprises a shaft 134, a pin head 136 positioned on a first end 138 of the shaft 134, and/or a channel 140 formed into the shaft 134 adjacent to a second end 142 of the shaft 134 opposite the first end 138. In some embodiments, the channel 140 is formed into both sides of the shaft 134. In some embodiments, the pin head 136 is sized and shaped to insert into a corresponding pin head cavity 144 on the cover 104 when the pin 132 is in the inserted position.

To avoid the pin 118 being confused with the pin 132 during installation, the pin 118 and the pin 132 may be formed to be non-compatible with the other hinge set so that they cannot be interchanged. For example, in some embodiments, the pin 118 of the first hinge set 112 has a diameter that is different from a diameter of the pin 132 of the second hinge set 114, as can be seen in a comparison of FIGS. 10-13 with FIGS. 15-18. This provides the benefit of making it easier to differentiate the pin 118 from the pin 132. Additionally, the first hinge set 112 and the second hinge set 114 may be formed such that the pin 118 and the pin 132 only fit within the corresponding hinge sets. This helps to avoid installation of the pin 118 in the second hinge set 114 or the pin 132 in the first hinge set 112.

As another example of how the pin 118 and the pin 132 may be formed to be non-compatible so that they cannot be interchanged, in some embodiments, the pin head 122 of the first hinge set 112 comprises a different size or shape from the pin head 136 of the second hinge set 114. Like the different diameters discussed above, this makes it easier to differentiate between the pins 116 and helps to point out when the pin 118 has been inserted into the second hinge set 114 or the pin 132 has been inserted into the first hinge set 112. The pin head 122 may curve in an opposite direction from the pin head 136, as seen in a comparison of FIGS. 10-13 with FIGS. 15-18. Alternatively, the pin head 122 and the pin head 136 may simply be different shapes or different sizes.

Figure 9:
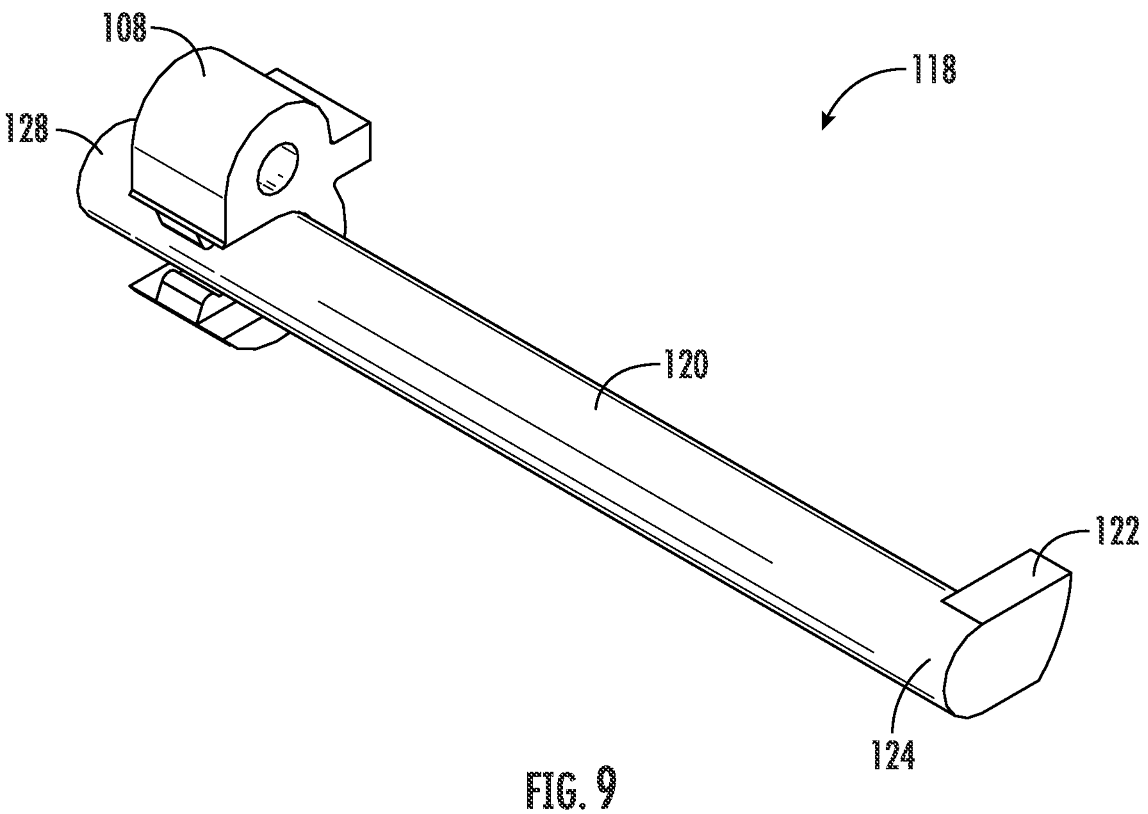
FIG. 9 is a perspective view of a horizontal hinge pin and clip of an electrical outlet cover assembly according to some embodiments.
Figure 14:
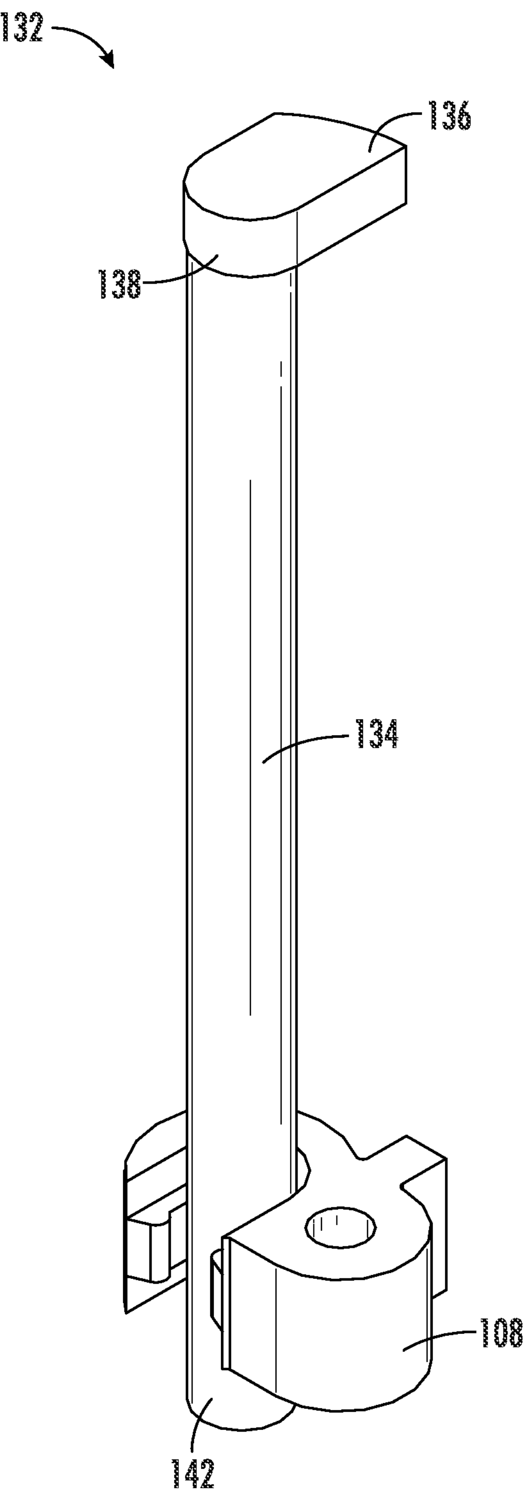
FIG. 14 is a perspective view of a vertical hinge pin and clip of an electrical outlet cover assembly according to some embodiments.
Figure 16:
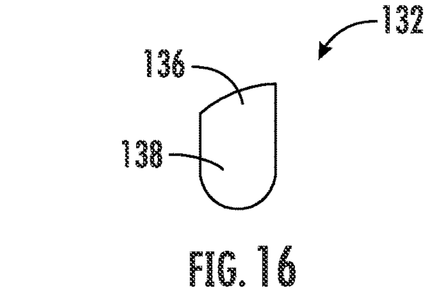
FIG. 16 is a top view of a vertical hinge pin according to some embodiments.
Figure 15:
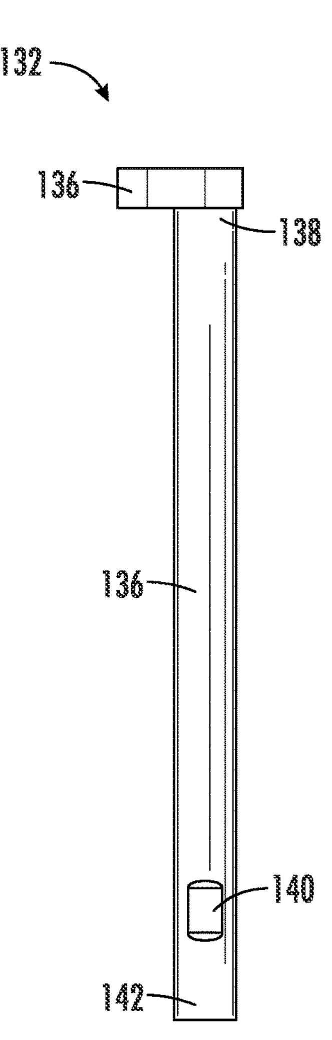
FIG. 15 is left-side view of a vertical hinge pin according to some embodiments.
Figure 15:
Figure 17:
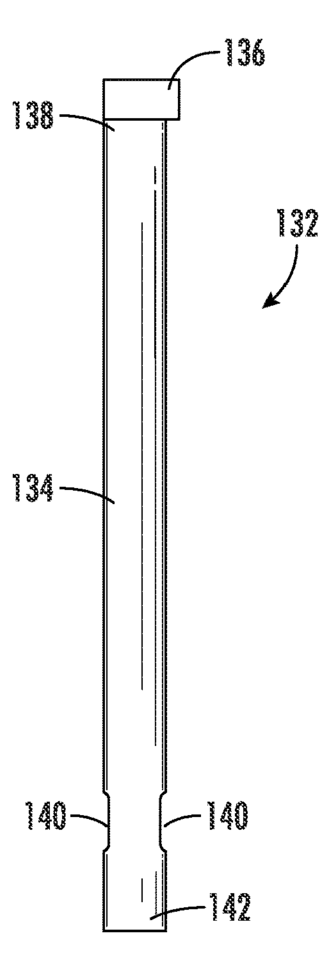
FIG. 17 is a front view of a vertical hinge pin according to some embodiments.
Figure 18:
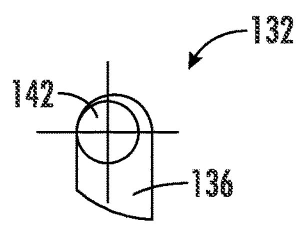
FIG. 18 is a bottom view of a vertical hinge pin according to some embodiments.
Figure 19:
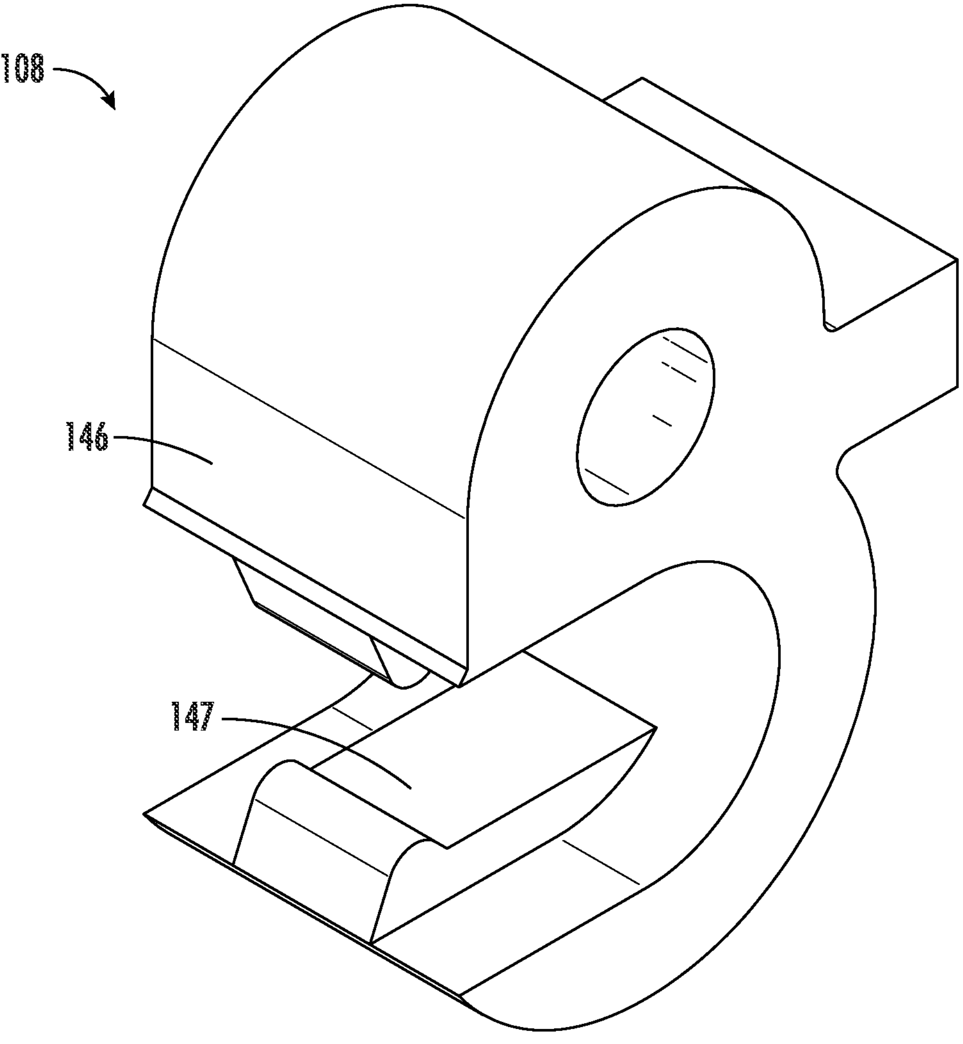
FIG. 19 is a perspective view of a clip of an electrical outlet cover assembly according to some embodiments.

Shown in more detail in FIG. 19, in some embodiments, the retainer 108 has a clip 146 that is configured to extend around the shaft 120 of the pin 118 and the shaft 134 of the pin 132. One retainer 108 may be formed to adapt to either of pin 118 or pin 132. Thus, once the user has selected whether the first hinge set 112 or the second hinge set 114, the retainer 108 can be used on the selected hinge set 106. In embodiments where the pin 118 has a channel 126 formed into the shaft 120 and/or the pin 132 has a channel 140 formed into the shaft 134, the clip 146 of the retainer 108 may be configured to extend around the shaft 120 of the pin 118 within the channel 126 or around the shaft 134 of the pin 132 within the channel 140, as shown in FIGS. 9 and 14. The clip 146 may include a center ridge 147 configured to further engage with the channel 126 or the channel 140 and prevent the retainer 108 from sliding along the shaft 120 or the shaft 134. When the retainer 108 is inserted onto the pin 116 while the pin 116 is in the inserted position, the retainer 108 is configured to lock the pin 116 in the inserted position, as explained in more detail below.

In addition to locking the pin 116 in the inserted position, the retainer 108 helps to align and space the pin 116 so that the cover 104 can smoothly pivot with respect to the base 102. This leads to smooth hinge action and movement. The retainer 108 also provides a bearing surface needed for the cover 104 to pivot between the closed position and the open position.

As mentioned above, in some embodiments, the pin 118 may have a different diameter from the pin 132. To allow the retainer 108 to function for both the pin 118 and the pin 132, in some embodiments, the channel 126 and the channel 140 may be formed with different depths such that, while the pin 118 and the pin 132 have different diameters, the thickness of the shaft 120 at the channel 126 is substantially equal to the thickness of the shaft 134 at the channel 140. The retainer 108 thus can fit both the pin 118 and the pin 132 without requiring drastic flexibility of the retainer 108.

In some embodiments, each of the hinge sets 106 further comprises a base arm 148 extending away from a side 150 of the base 102 and a cover arm 154 extending away from a side 156 the cover 104. The base arm 148 and the cover arm 154 may be configured to align with each other when the cover 104 is coupled to the base 102. In some embodiments, a base hole 152 extends through the base arm 148. In some embodiments, the base hole 152 is parallel with the side 150 of the base 102. In some embodiments, a first cover hole 158 extends through a first end 160 of the cover arm 154, and in some embodiments, a second cover hole 162 extends into a second end 164 of the cover arm 154. The first cover hole 158 and the second cover hole 162 may be aligned. In some embodiments, the first cover hole 158 is a through hole, and in some embodiments, the second cover hole 162 is a blind hole and does not extend all the way through the second end 164 of the cover arm 154. In some embodiments, the first cover hole 158 and the second cover hole 162 are spaced apart to fit the base arm 148 and the retainer 108 between the first cover hole 158 and the second cover hole 162.

When in the inserted position, in some embodiments, the pin 116 extends through the first cover hole 158, through the base hole 152, and into the second cover hole 162. Once the pin 116 is in this position, the retainer 108 can be inserted into the channel 126, 140 of the pin 116. In some embodiments, the retainer 108 is sized and/or shaped so that it does not fit through the base hole 152 or the first cover hole 158. Once the retainer 108 is inserted into the channel 126, 140, the pin 116 becomes locked in the inserted position because the pin 116 can no longer be pulled back through the base hole 152 or the first cover hole 158 while the retainer 108 is positioned on the shaft 120, 134.

In some embodiments, the base 102, the cover 104, and the hinge sets 106, including the pins 116, are formed of a die cast metal. This makes these components durable. The retainer 108 may be formed of a plastic material. This allows the retainer 108 to easily snap around and hold securely to the pins 116. In some embodiments, the base 102, the cover 104, and the hinge sets 106 are formed of a plastic material, and in some embodiments, the retainer 108 is formed of a metal.

Many additional implementations are possible. Further implementations are within the CLAIMS.

It will be understood that implementations of the outlet cover include but are not limited to the specific components disclosed herein, as virtually any components consistent with the intended operation of various outlet covers may be utilized. Accordingly, for example, it should be understood that, while the drawings and accompanying text show and describe particular outlet cover implementations, any such implementation may comprise any shape, size, style, type, model, version, class, grade, measurement, concentration, material, weight, quantity, and/or the like consistent with the intended operation of outlet covers.

The concepts disclosed herein are not limited to the specific outlet covers shown herein. For example, it is specifically contemplated that the components included in particular outlet covers may be formed of any of many different types of materials or combinations that can readily be formed into shaped objects and that are consistent with the intended operation of the outlet cover. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, outlet covers may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular outlet cover implementations, it should be readily apparent that a number of modifications may be made without departing from the spirit thereof and that these implementations may be applied to other implementations disclosed or undisclosed. The presently disclosed outlet covers are, therefore, to be considered in all respects as illustrative and not restrictive.

I claim:

1. An electrical outlet cover assembly, comprising:

a base configured to surround an electrical device;

a cover configured to hingedly couple with the base to enclose and protect the electrical device;

at least two hinge sets each configured to separately couple the cover to the base, wherein each of the at least two hinge sets includes a pin comprising a shaft, a pin head positioned on a first end of the shaft, and a channel formed into the shaft adjacent to a second end of the shaft opposite the first end, wherein the pin is configured to rotatably couple with the base and fixedly couple with the cover in an inserted position to hingedly couple the cover to the base; and at least one retainer having a clip configured to removably extend around the shaft of one of the pins of the at least two hinge sets within the channel and lock the pin in the inserted position;

wherein the at least two hinge sets comprises a vertical hinge set configured to hingedly pivot the cover in relation to the base about a first hinge axis and a horizontal hinge set configured to hingedly pivot the cover in relation to the base about a second hinge axis perpendicular to the first hinge axis;

wherein the pin of the vertical hinge set has a diameter that is different from a diameter of the pin of the horizontal hinge set; and wherein the pin head of each of the pins of the at least two hinge sets is sized and shaped to insert into a corresponding pin head cavity on the cover when the pin is in the inserted position, wherein each of the pin heads comprises a different size or shape from each other pin head of the at least two hinge sets.

2. The electrical outlet cover assembly of claim 1, each of the at least two hinge sets comprising a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm.

3. The electrical outlet cover assembly of claim 2, wherein the first cover hole is a through hole and the second cover hole is a blind hole and does not extend through the cover arm.

4. The electrical outlet cover assembly of claim 2, wherein, when in the inserted position, the pin extends through the first cover hole, extends through the base hole, and extends into the second cover hole.

5. The electrical outlet cover assembly of claim 2, wherein the first cover hole and the second cover hole of the cover arm are spaced apart to fit the base arm and the retainer between the first cover hole and the second cover hole.

6. An electrical outlet cover assembly, comprising:

a base configured to surround an electrical device;

a cover configured to couple with the base to enclose and protect the electrical device; and at least two hinge sets each configured to separately couple the cover to the base, wherein each of the at least two hinge sets includes a pin comprising a shaft and a pin head positioned on a first end of the shaft, wherein the pin is configured to couple with the base and the cover in an inserted position to couple the cover to the base;

wherein the pin head of each of the pins of the at least two hinge sets is sized and shaped to insert into a corresponding pin head cavity on the base or the cover when the pin is in the inserted position, wherein each of the pin heads comprises a different size or shape from each other pin head of the at least two hinge sets; and further comprising a retainer having a clip configured to removably extend around the shaft of one of the pins of the at least two hinge sets and lock the pin in the inserted position.

7. The electrical outlet cover assembly of claim 6, the pin of each of the at least two hinge sets further comprising a channel formed into the shaft adjacent to a second end of the shaft opposite the first end, wherein the clip of the retainer is configured to extend around the shaft of the pin within the channel.

8. The electrical outlet cover assembly of claim 6, wherein the at least two hinge sets comprises a first hinge set and a second hinge set and wherein the pin of the first hinge set has a diameter that is different from a diameter of the pin of the second hinge set.

9. The electrical outlet cover assembly of claim 6, each of the at least two hinge sets comprising a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm.

10. The electrical outlet cover assembly of claim 9, wherein the first cover hole is a through hole and the second cover hole is a blind hole and does not extend through the cover arm.

11. The electrical outlet cover assembly of claim 9, wherein, when in the inserted position, the pin extends through the first cover hole, extends through the base hole, and extends into the second cover hole.

12. The electrical outlet cover assembly of claim 9, wherein the first cover hole and the second cover hole of the cover arm are spaced apart to fit the base arm and a retainer between the first cover hole and the second cover hole, wherein the retainer has a clip configured to extend around the shaft of one of the pins of the at least two hinge sets and lock the pin in the inserted position.

13. The electrical outlet cover assembly of claim 6, wherein the clip of the retainer includes a center ridge configured to engage with a channel formed into the shaft of the pin and prevent the retainer from sliding along the shaft.

14. An electrical outlet cover assembly, comprising:

a base configured to surround an electrical device;

a cover configured to couple with the base to enclose and protect the electrical device; and at least two hinge sets configured to separately couple the cover to the base, wherein each of the at least two hinge sets has a pin configured to couple with the base and the cover in an inserted position to couple the cover to the base;

wherein the at least two hinge sets comprises a first hinge set and a second hinge set and wherein the pin of the first hinge set has a diameter that is different from a diameter of the pin of the second hinge set; and further comprising a retainer having a clip configured to extend around the shaft of one of the pins of the at least two hinge sets and lock the pin in the inserted position.

15. The electrical outlet cover assembly of claim 14, the pin of each of the at least two hinge sets further comprising a channel formed into the shaft adjacent to a second end of the shaft opposite the first end, wherein the clip of the retainer is configured to removably extend around the shaft of the pin within the channel.

16. The electrical outlet cover assembly of claim 14, each of the at least two hinge sets comprising a base arm extending away from a side of the base and a cover arm extending away from a side of the cover, wherein a base hole extends through the base arm parallel with the side of the base, a first cover hole extends through a first end of the cover arm, and a second cover hole aligned with the first cover hole extends into a second end of the cover arm.

17. The electrical outlet cover assembly of claim 16, wherein the first cover hole is a through hole and the second cover hole is a blind hole and does not extend through the cover arm.

18. The electrical outlet cover assembly of claim 16, wherein, when in the inserted position, the pin extends through the first cover hole, extends through the base hole, and extends into the second cover hole.

19. The electrical outlet cover assembly of claim 16, wherein the first cover hole and the second cover hole of the cover arm are spaced apart to fit the base arm and a retainer between the first cover hole and the second cover hole, wherein the retainer has a clip configured to extend around the shaft of one of the pins of the at least two hinge sets and lock the pin in the inserted position.

20. The electrical outlet cover assembly of claim 14, wherein the pin of each of the at least two hinge sets comprises a channel formed into the shaft, and wherein the channels of the pins have different depths such that a thickness of the shaft of the pin of the first hinge set at the channel is substantially equal to a thickness of the shaft of the pin of the second hinge set at the channel.

* * * * *